June 17, 1958  E. FIFIELD  2,839,336
QUICK ACTING WHEEL CLAMP
Filed May 14, 1956
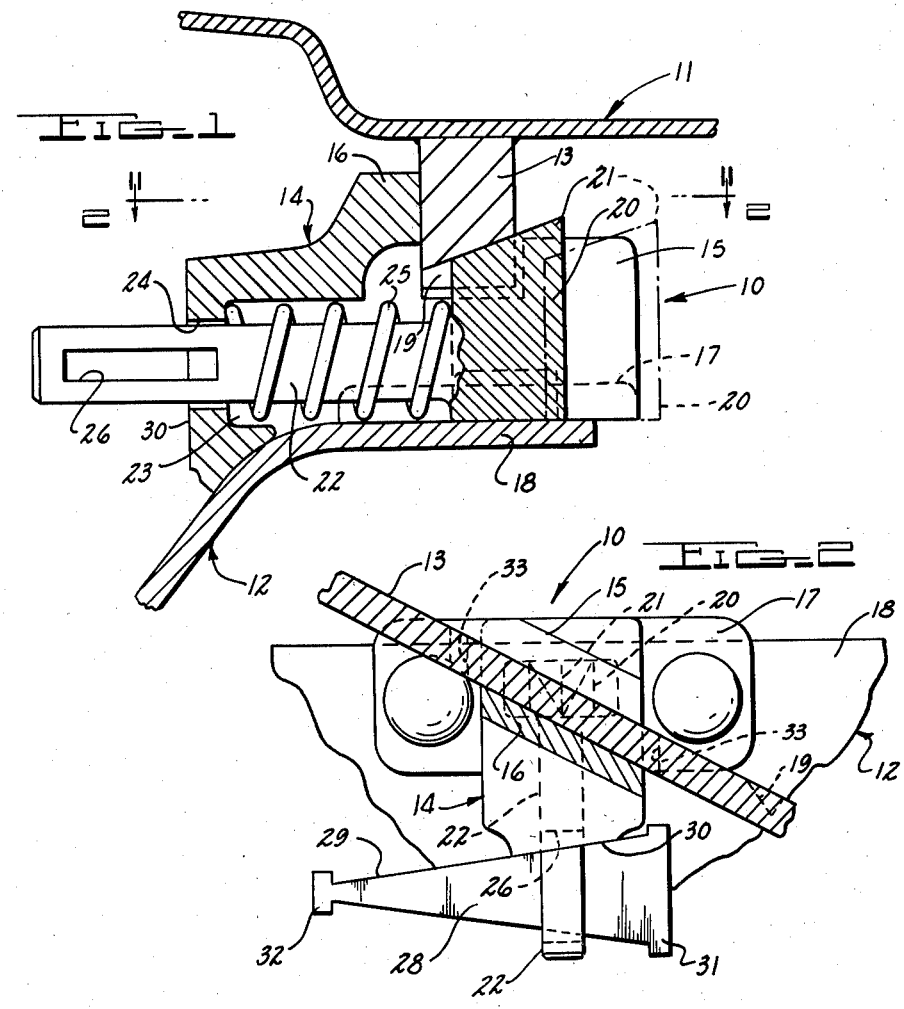
INVENTOR.
EDWARD FIFIELD
BY Whittemore, Hulbert
Belknap
ATTORNEYS

United States Patent Office 2,839,336
Patented June 17, 1958

---

2,839,336

QUICK ACTING WHEEL CLAMP

Edward Fifield, Detroit, Mich., assignor to Kelsey-Hayes Company, a corporation of Delaware Application May 14, 1956, Serial No. 584,852

5 Claims. (Cl. 301—9)

The present invention relates to an improved manually operable clamp for variable or adjustable tread tractor and like wheels. A clamp is provided which is quickly actuable manually to lock the wheel rim in fixed, rigid relation to the wheel body, and to unlock and release the same for axial adjustment in reference to the body upon relative rotation of the rim and wheel body.

In this respect, the invention relates more particularly to a clamp for a variable tread wheel in which a plurality of inclined cam rail sections spaced about the inner periphery of the rim have camming engagement with fixed guides on the wheel body during the relative rotation.

It is an object of the invention to provide a quick acting clamp for an adjustable tread structure of this sort which is extremely simple, compact and inexpensive as to its parts, and which is very easily and quickly manipulable to engage and disengage the locking provisions thereof.

It is a more specific object of the invention to provide a quick acting wheel clamp of the above description which includes an axially shiftable, releasable clamping head or bolt on the wheel body operatively engageable and disengageable with an inclined cam rail on the rim to lock and release the latter, respectively, and simplified means to releasably hold the head in locking condition, in the form of a single wedge element received in a slotted stem which is fixedly associated with the head to hold the latter in its engaged position. The wedge is disengaged from the stem by a single hammer tap, and a spring then acts on the head to automatically urge the same to a released position.

The foregoing as well as other objects will be made more apparent as this description proceeds, especially when considered in connection with the accompanying drawings, wherein:

Fig. 1 is a fragmentary view in section on a plane radial of the wheel structure, showing details of the improved clamp, with its clamp head indicated in solid and dot--dash lines, respectively, in its engaged and disengaged positions;

Fig. 2 is a fragmentary view in horizontal section along line 2—2 of Fig. 1; and Fig. 3 is a fragmentary view in side elevation, as viewed from the left of Fig. 1.

The clamp of the invention is generally designated by the reference numeral 10, and a conventional tractor wheel rim and wheel body with which it is associated are generally indicated at 11 and 12, respectively, of Figs. 1 and 2. The rim 11 is equipped with a series of circumferentially spaced, inclined cam rails 13 welded on its inner periphery. The clamp 10 includes a cast housing member 14 which affords radially outwardly projecting guide lugs 15, 16, respectively, in axially spaced relation to one another. These lugs outwardly straddle the cam rail 13, and the housing 14 has integral brackets or ears 17 are bolted to an annular axial flange 18 of the wheel body 12 to hold the housing fixedly in place on the body. Accordingly, upon release of clamp 10 and relative axial movement of the wheel body and rim 11, the latter will be axially shifted for a desired adjustment of the spacing of the wheel treads.

The rail 13 is provided with a plurality of longitudinally spaced clamping notches or recesses 19 along its inner peripheral surface which are of triangular cross section, tapering radially and axially from the inner side of rail 13 toward its outer face. The reference numeral 20 designates a locking bolt or head which is guided for axial shifting movement on the wheel body flange 18, and this head is provided on its outer radial extremity with a locking or clamping lug 21 which is of triangular tapered outline, as shown in Figures 1 and 2. In operative or engaged position of the bolt 20, the lug 21 has mating or nested engagement in one of the notches 19 of rail 13 to securely hold rim 11 on the wheel body 12, since the head 20 is guided on flange 18 and held against relative rotation thereon.

The clamp head 20 has an integral, axially outwardly projecting stem 22 which extends through a recessed space 23 in the housing and an outer axial bore 24; and a coil compression spring 25 encircles this stem, bearing oppositely against the head 20 and housing 14 to urge the head from its solid line, operatively engaged position (Fig. 1) to its inoperative or released position indicated in dot--dash line.

The outer portion of stem 22 carries an axially elongated slot 26 of rectangular outline, and as illustrated in Figs. 2 and 3, a tapered wedge 28 is inserted in the slot 26, the inner inclined face 29 of this wedge having flush engagement with an outer inclined face 30 of the housing 14 which surrounds its bore 24. Wedge 28 may be provided with enlarged striking portions 31, 32 at its opposite ends.

The mode of use of the clamp 10 is believed to be apparent from the foregoing description. With the wedge 28 fully engaged in stem slot 26, as illustrated in Figs. 2 and 3, the clamp head 20 is urged outwardly against the force of spring 25 to engage its clamp lug 21 with one of the lock notches 19 of rail 13. A hammer tap on the enlargement 32 of the small end of the wedge shifts the latter to the right, whereupon spring 25 automatically urges clamp head 20 to its released, dot--dash line position of Fig. 1. At this point the enlargement 32 on the small end abuts an adjacent edge of the housing 14 to retain the wedge in the slot.

Upon desired axial adjustment of the rim, the head 20 is re-engaged by driving the wedge 28 to the left in stem slot 26. A light blow on the enlargement 31 drives the wedge surface 29 into secure frictional holding position against the housing 14.

For the purpose of selectively controlling the relative rotatable adjustment of the wheel body and rim, the rails 13 are formed with the equally spaced transverse holes 33 for engagement by suitable shoulder pins which are adapted to be engaged by the adjacent edges of the clamping lugs 16. This insures registration of the clamp heads 20 with rail notches 19 in the adjusted position of the rim.

A quick lock and release clamp is provided which is extremely simple and inexpensive, and whose operations to clampingly engage and disengage it are very easily and expeditiously performed, indeed.

What I claim as my invention is:

1. A quick acting clamp for a variable tread wheel of the type having a rim shiftable axially of a coaxial wheel body by the relatively rotative coaction of camming members carried for rotation with the rim and body, respectively, comprising a clamp head slidable axially on said wheel body into and out of clamping engagement with said rim, a stem secured to said head and extending axially outwardly of said body, said stem having an opening therein and said wheel body having a fixed abutment surface adjacent said opening, and a manually actuable wedge received in said opening in releasably wedged engagement with said abutment surface.

2. A quick acting clamp for a variable tread wheel of the type having a rim shiftable axially of a coaxial wheel body by the relatively rotative coaction of camming members carried for rotation with the rim and body, respectively, comprising a clamp head slidable axially on said wheel body into and out of clamping engagement with said rim, a stem secured to said head and extending axially outwardly of said body and past said camming members, said stem having an opening therein and said wheel body having a fixed inclined abutment surface adjacent said opening, and a manually actuable wedge received in said opening in releasably wedged engagement with said abutment surface.

3. A quick acting clamp for a variable tread wheel of the type having a rim shiftable axially of a coaxial wheel body by the relatively rotative coaction of camming members carried for rotation with the rim and body, respectively, comprising a clamp head slidable axially on said wheel body into and out of clamping engagement with said rim, a stem secured to said head and extending axially outwardly of said body and past said camming members, said stem having an opening therein and said wheel body having a fixed inclined abutment surface adjacent said opening, and a manually actuable wedge received in said opening in releasably wedged engagement with said abutment surface, said wedge having an inclined surface in flush contact with said abutment surface when engaged.

4. In a variable tread wheel having a rim provided with a circumferentially extending axially inclined rail and a wheel body having means cammingly engageable with said rail to effect relative axial adjustment of the rim and wheel body upon relative rotation thereof, a clamping member on said wheel body slidable axially thereof into and out of clamping engagement with said rail, said rail having a formation engageable by said member to secure the rim and body against relative rotation in an adjusted position thereof, said clamping member having an axially extending element provided with an opening, and a manually actuable wedge received in said opening in releasable wedged engagement with said element and said wheel body.

5. In a variable tread wheel having a rim provided with a circumferentially extending axially inclined rail and a wheel body having means cammingly engageable with said rail to effect relative axial adjustment of the rim and wheel body upon relative rotation thereof, a clamping member on said wheel body slidable axially thereof into and out of clamping engagement with said rail, said rail having a plurality of formations selectively engageable by said member to secure the rim and body against relative rotation in an adjusted position thereof, said clamping member having an axially extending element provided with an opening, and a manually actuable wedge received in said opening in releasable wedged engagement with said element and said wheel body.

References Cited in the file of this patent

UNITED STATES PATENTS

| | | |
|---|---|---|
| 1,495,546 | Angel | May 27, 1924 |
| 2,417,139 | Strehlow | Mar. 11, 1947 |

FOREIGN PATENTS

| | | |
|---|---|---|
| 479,178 | France | Nov. 26, 1915 |